(12) United States Patent
Yoo et al.

(10) Patent No.: US 12,163,558 B2
(45) Date of Patent: Dec. 10, 2024

(54) CONSTANT VELOCITY JOINT FOR VEHICLE

(71) Applicants: HYUNDAI MOTOR COMPANY, Seoul (KR); KIA CORPORATION, Seoul (KR); HYUNDAI WIA Corporation, Changwon-si (KR)

(72) Inventors: Sung Su Yoo, Suwon-si (KR); Won Jun Choi, Yangsan-si (KR); Hee Il Kim, Hwaseong-si (KR); Chang Hee Jeong, Yongin-si (KR); Yeong Wook Cho, Uiwang-si (KR); Bum Jae Lee, Yongin-si (KR)

(73) Assignees: HYUNDAI MOTOR COMPANY, Seoul (KR); KIA CORPORATION, Seoul (KR); HYUNDAI WIA Corporation, Changwon-si (KR)

( * ) Notice: Subject to any disclaimer, the term of this patent is extended or adjusted under 35 U.S.C. 154(b) by 0 days.

(21) Appl. No.: 18/238,742

(22) Filed: Aug. 28, 2023

(65) Prior Publication Data

US 2023/0400066 A1    Dec. 14, 2023

Related U.S. Application Data

(62) Division of application No. 17/188,204, filed on Mar. 1, 2021, now Pat. No. 11,773,912.

(30) Foreign Application Priority Data

Aug. 11, 2020  (KR) ........................ 10-2020-0100708

(51) Int. Cl.
*F16D 3/221* (2006.01)
*F16D 3/84* (2006.01)
(Continued)

(52) U.S. Cl.
CPC ............ *F16D 3/221* (2013.01); *F16D 3/845* (2013.01); *B60B 35/128* (2013.01); *B62D 7/18* (2013.01); *Y10S 464/906* (2013.01)

(58) Field of Classification Search
CPC ....... F16D 3/221; F16D 3/845; B60B 35/128; B62D 7/18; Y10S 464/906
(Continued)

(56) References Cited

U.S. PATENT DOCUMENTS 4,536,038 A    8/1985   Krude
4,775,190 A   10/1988   Jacob
(Continued)

FOREIGN PATENT DOCUMENTS

GB            962455 A  *  7/1964
KR       20190130311 A    11/2019

*Primary Examiner* — Greg Binda
(74) *Attorney, Agent, or Firm* — Lempia Summerfield Katz LLC (57) ABSTRACT

A constant velocity joint for a vehicle. The constant velocity joint includes: an axle housing fixed to a knuckle by a hub bearing, and a joint assembly inserted into the axle housing to transmit power from a shaft to the axle housing through a plurality of joint balls. In particular, the axle housing includes an extension portion which is extended from an end portion of the axle housing in a radial direction of the axle housing, and the extension portion provides a pressing force to an inner race of the hub bearing in an axial direction of the axle housing. The constant velocity joint further includes a boot surrounding an outer side of the extension portion and coupled to the extension portion so as to form a restraining force between the extension portion and the boot in the axial direction.

11 Claims, 5 Drawing Sheets

(51) Int. Cl.
 *B60B 35/12* (2006.01)
 *B62D 7/18* (2006.01)
(58) Field of Classification Search
 USPC .................................................. 464/175, 178
 See application file for complete search history.

(56) References Cited

U.S. PATENT DOCUMENTS

| | | |
|---|---|---|
| 6,036,371 A | 3/2000 | Onose |
| 9,694,627 B2 | 7/2017 | Bosco et al. |
| 2006/0040752 A1 | 2/2006 | Ishijima et al. |

\* cited by examiner

CONSTANT VELOCITY JOINT FOR VEHICLE

CROSS REFERENCE TO RELATED APPLICATION

The present application is a divisional application of non-provisional U.S. patent application Ser. No. 17/188,204, filed on Mar. 1, 2021, now U.S. Pat. No. 11,773,912 which claims priority to and the benefit of Korean Patent Application No. 10-2020-0100708, filed on Aug. 11, 2020, the entire contents of each of which are incorporated herein by reference.

FIELD

The present disclosure relates to a structure of a constant velocity joint transmitting power for driving a vehicle to a driving wheel.

BACKGROUND

The statements in this section merely provide background information related to the present disclosure and may not constitute prior art.

A constant velocity joint, which is a component absorbing a displacement between a differential and a driving wheel and transmitting power to the driving wheel at a constant angular velocity, is configured to be surrounded by a boot in an area where refraction is allowed, thereby preventing penetration of foreign substances from outside.

It is common that one side of the constant velocity joint is coupled to the differential and the other side of the constant velocity joint is connected to the driving wheel through a wheel hub, but the wheel hub is integrally formed with the constant velocity joint in some cases.

The contents described as the related art have been provided only to assist in understanding the background of the present disclosure and should not be considered as corresponding to the related art known to those having ordinary skill in the art.

SUMMARY

The present disclosure provides a constant velocity joint for a vehicle in which a firmly coupled state of a boot can be easily secured and a sealing function of the coupled boot can be excellently secured when the constant velocity joint has a wheel hub that is integrally formed therewith, thereby ultimately securing sufficient durability in a refraction portion of the constant velocity joint and moreover securely assembling and maintaining the constant velocity joint in an excellent manner.

According to one form of the present disclosure, a constant velocity joint for a vehicle includes: an axle housing fixed to a knuckle by a hub bearing; a joint assembly inserted into an inner diameter portion of the axle housing and configured to transmit power from a shaft to the axle housing through a plurality of joint balls; an extension portion extended from an end portion of the axle housing in a radial direction of the axle housing, wherein the extension portion is disposed on an inward side of a vehicle body of the vehicle and configured to provide a pressing force to an inner race of the hub bearing in an axial direction of the axle housing; and a boot having one side that surrounds an outer side of the extension portion, is coupled to the extension portion, and forms a restraining force between the extension portion and the boot in the axial direction.

The extension portion may have a protrusion protruding to have an outer diameter greater than that of an end portion of the inner race on the inward side of the vehicle body.

The boot may have a first contact portion contacting an end portion of the extension portion on the inward side of the vehicle body, a second contact portion connected to the first contact portion and contacting an outermost side of the protrusion, and a third contact portion connected to the second contact portion and contacting the protrusion on an outward side of the vehicle body to form an inner groove into which the protrusion is inserted.

The protrusion may have a first inclined portion formed on the outward side of the vehicle body to have an outer diameter gradually decreasing toward the outward side of the vehicle body; and the third contact portion of the boot may be formed in parallel with the first inclined portion.

The boot may have a first protruding end integrally formed to protrude locally from the first contact portion toward the end portion of the extension portion on the inward side of the vehicle body.

The inner race may have a second inclined portion formed to have an outer diameter gradually increasing from an end portion thereof meeting the extension portion toward the outward side of the vehicle body; and the boot may have a fourth contact portion connected to the third contact portion and formed in parallel with the second inclined portion to contact the second inclined portion.

The boot may have a second protruding end integrally formed to protrude locally from the fourth contact portion toward the second inclined portion of the inner race.

The inner race may have a first circumferential portion formed to have a constant outer diameter from an end portion thereof meeting the extension portion toward the outward side of the vehicle body, and a second circumferential portion connected to the first circumferential portion and formed to have a constant outer diameter greater than that of the first circumferential portion; and the boot may extend from the third contact portion to surround both the first circumferential portion and the second circumferential portion.

An inner side surface of the boot surrounding the second circumferential portion may form a third inclined portion having an inner diameter gradually decreasing toward the outward side of the vehicle body.

The end portion of the axle housing on the inward side of the vehicle body may be deformed to extend outwardly in the radial direction through an orbital forming method, such that the extension portion has a protrusion integrally formed to protrude to have an outer diameter greater than that of the end portion of the inner race on the inward side of the vehicle body while pressing an end portion of the inner race on the inward side of the vehicle body in the axial direction to fix the inner race.

A band may be fastened onto an outer side of the boot to press the boot toward the end portion of the inner race on the inward side of the vehicle body and the protrusion.

The boot may have a band fastening groove in the outer side thereof to fasten the band thereto; and when an axial-direction thickness of the extension portion is denoted as t, and a distance from an end portion of the extension portion on the inward side of the vehicle body to an end portion of the band fastening groove on the inward side of the vehicle body is denoted as L, the end portion of the band fastening groove on the inward side of the vehicle body may be located within a range of $0 \le L/t \le 0.5$.

When the outer diameter of the protrusion is denoted as d, and the outer diameter of the end portion of the inner race on the inward side of the vehicle body is denoted as D1, the outer diameter d of the protrusion may be within a range of $1.02 \leq d/D1 \leq 1.05$ to securely assemble the boot and inhibit or prevent the boot from escaping.

When an axial-direction width of the band is denoted as B and an axial-direction thickness of the extension portion is denoted as t, the width B of the band is within a range of $0.3 \leq t/B \leq 1$ to secure sufficient sealability.

According to another form of the present disclosure, a boot for a constant velocity joint of a vehicle is formed to allow an extension portion of an axle housing to be inserted thereinto to form a restraining force between the extension portion and the boot in an axial direction of the axle housing. In particular, the axle housing receives power from a shaft through a plurality of joint balls and is fixed to a knuckle by a hub bearing, the extension portion is formed by deforming a part of the axle housing, and the extension portion extends in a radial direction of the axle housing and presses an inner race of the hub bearing in the axial direction to fix the inner race.

The boot may have a first contact portion contacting an end portion of the extension portion on an inward side of a vehicle body, a second contact portion connected to the first contact portion and contacting an outermost side of a protrusion protruding such that the extension portion has an outer diameter greater than that of an end portion of the inner race on the inward side of the vehicle body, and a third contact portion connected to the second contact portion and contacting the protrusion on an outward side of the vehicle body.

When the protrusion has a first inclined portion formed on the outward side of the vehicle body to have an outer diameter gradually decreasing toward the outward side of the vehicle body, the third contact portion of the boot may be formed in parallel with the first inclined portion.

The boot may have a first protruding end integrally formed to protrude locally from the first contact portion toward the end portion of the extension portion on the inward side of the vehicle body.

When the inner race has a second inclined portion formed to have an outer diameter gradually increasing from an end portion thereof meeting the extension portion toward the outward side of the vehicle body, the boot may have a fourth contact portion connected to the third contact portion and formed in parallel with the second inclined portion to contact the second inclined portion.

The boot may have a second protruding end integrally formed to protrude locally from the fourth contact portion toward the second inclined portion of the inner race.

When the inner race may have a first circumferential portion formed to have a constant outer diameter from an end portion thereof meeting the extension portion toward the outward side of the vehicle body, and a second circumferential portion connected to the first circumferential portion and formed to have a constant outer diameter greater than that of the first circumferential portion, the boot may extend from the third contact portion to surround both the first circumferential portion and the second circumferential portion.

An inner side surface of the boot surrounding the second circumferential portion may form a third inclined portion having an inner diameter gradually decreasing toward the outward side of the vehicle body.

The boot may have a band fastening groove in an outer side thereof to fasten a band thereto; and when an axial-direction thickness of the extension portion is denoted as t, and a distance from the end portion of the extension portion on the inward side of the vehicle body to an end portion of the band fastening groove on the inward side of the vehicle body is denoted as L, the end portion of the band fastening groove on the inward side of the vehicle body may be located within a range of $0 \leq L/t \leq 0.5$.

When an axial-direction width of the band is denoted as B and an axial-direction thickness of the extension portion is denoted as t, the width B of the band may be within a range of $0.3 \leq t/B \leq 1$; and the band fastening groove may be formed to have a width to accommodate the band and restrain both ends of the band in the axial direction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 to 5, a constant velocity joint for a vehicle in some forms of the present disclosure includes in common: an axle housing 7 having a plurality of hub bolts 1 and fixed to a knuckle 5 by a hub bearing 3; a joint assembly 13 inserted into an inner diameter portion of the axle housing 7 and configured to transmit power from a shaft 9 to the axle housing 7 through a plurality of joint balls 11; an extension portion 15 extended from an end portion of the axle housing 7 on an inward side of a vehicle body to extend in a radial direction of the axle housing 7 such that the extension portion 15 provides a pressing force to an inner race 3-1 of the hub bearing 3 in an axial direction of the axle housing 7; and a boot 17 surrounding an outer side of the extension portion and coupled to the extension portion 15 so as to form a restraining force between the extension portion 15 and the boot 17 in the axial direction.

That is, the constant velocity joint according to the present disclosure, which is configured to convey the power transmitted from the shaft 9 to the axle housing 7 through the joint assembly 13, is configured as a hub-integrated constant velocity joint. Here, the axle housing 7 is configured to allow the boot 17 to be coupled thereto through the extension portion 15 formed by deforming a part of the axle housing 7 to extend in the radial direction to fix the inner race 3-1 of the hub bearing 3.

Figure 1:
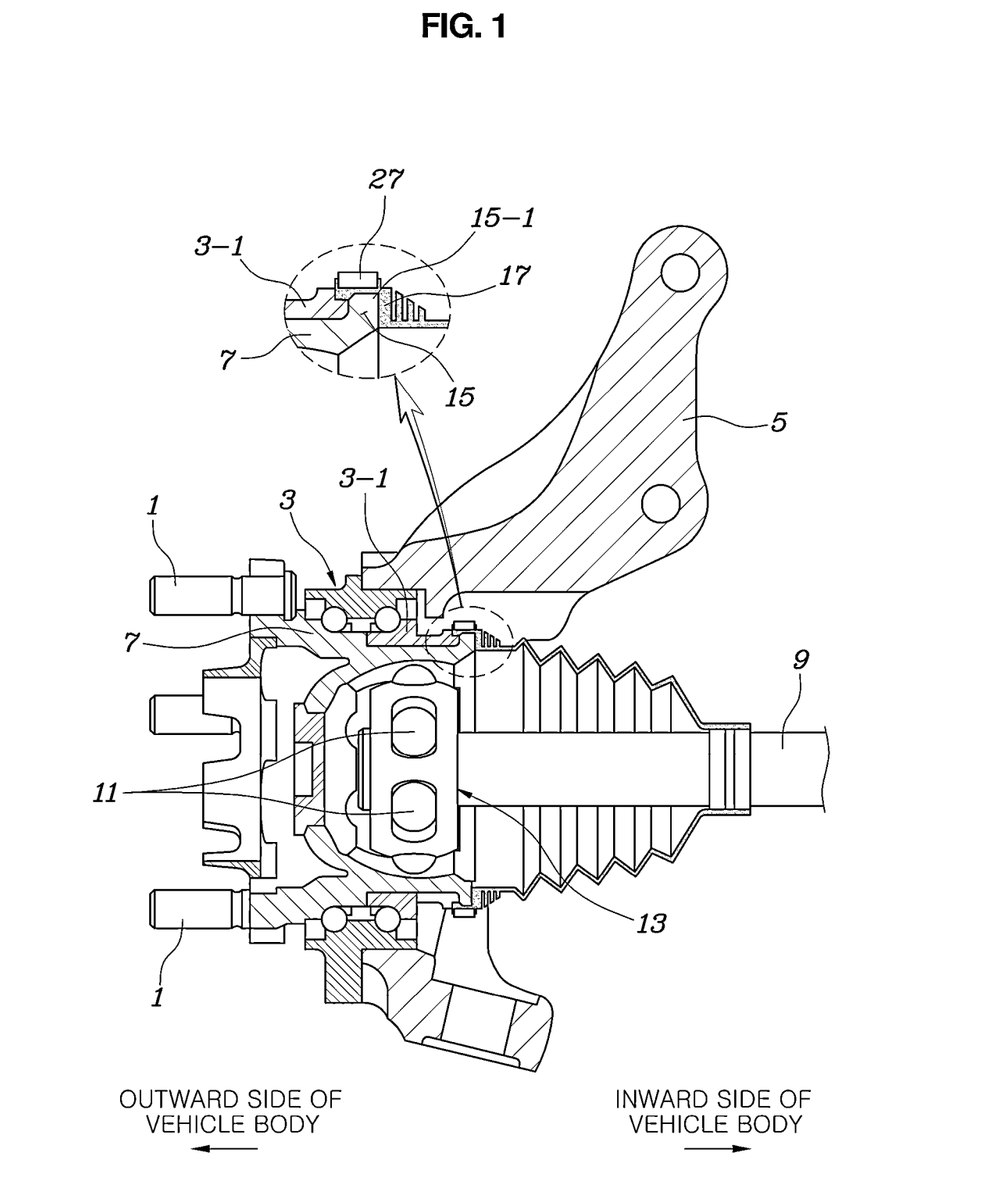
FIG. 1 is a view illustrating a constant velocity joint for a vehicle according to a first form of the present disclosure.
Figure 2:
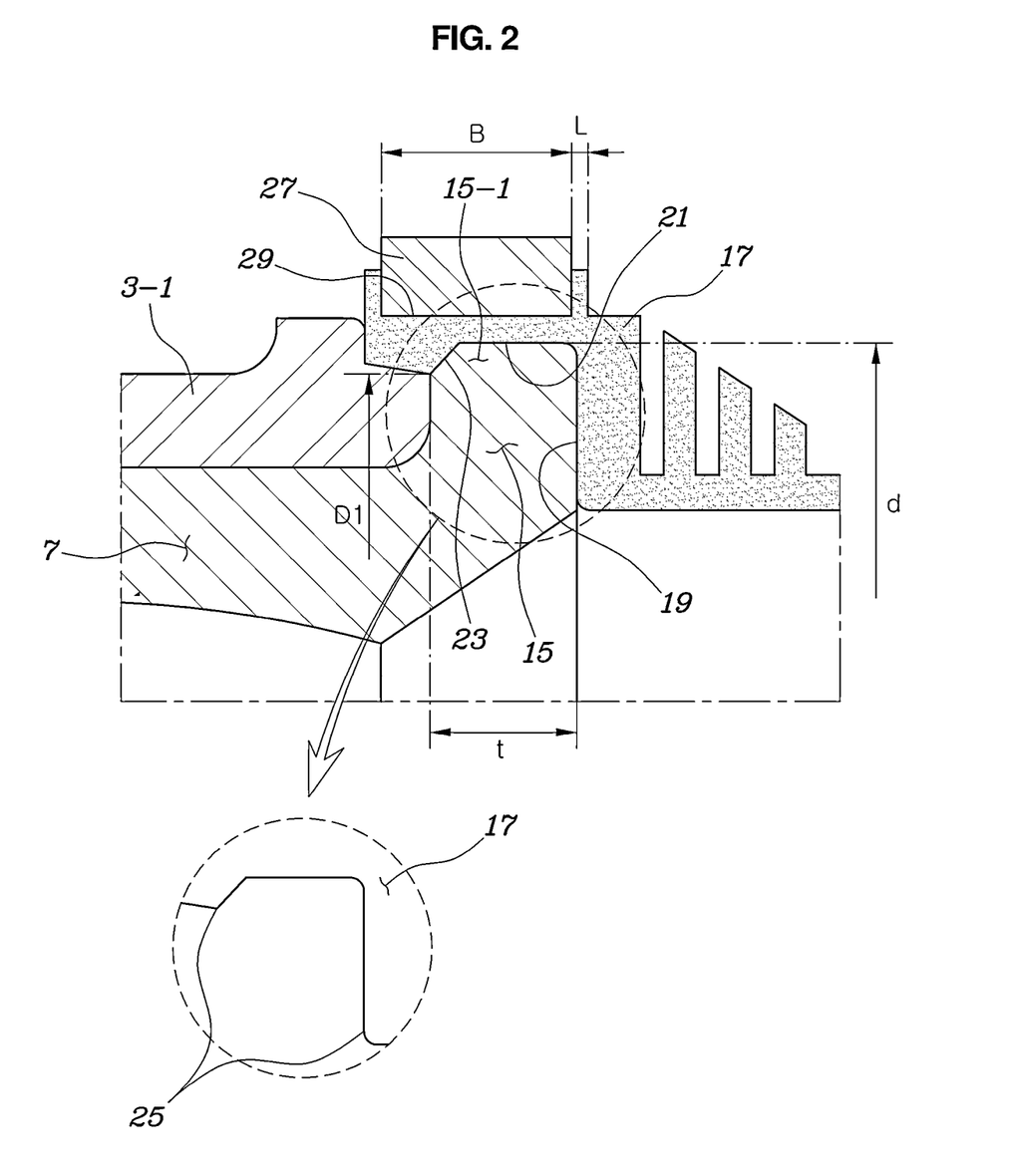
FIG. 2 is a detailed view of a main portion of FIG. 1.

The extension portion 15 has a protrusion 15-1 protruding to have an outer diameter greater than that of an end portion of the inner race 3-1 on the inward side of the vehicle body.

That is, the protrusion 15-1 is a part of the extension portion 15, meaning a portion protruding outwardly beyond a portion pressing the inner race 3-1 in the axial direction in the extension portion 15 formed by deforming the end portion of the axle housing 7 on the inward side of the vehicle body to extend outwardly in the radial direction.

By deforming the end portion of the axle housing 7 on the inward side of the vehicle body to extend outwardly in the radial direction through an orbital forming method, the extension portion 15 is substantially capable of not only pressing the end portion of the inner race 3-1 on the inward side of the vehicle body in the axial direction to fix the inner race 3-1 but also having the protrusion 15-1 protruding to have an outer diameter greater than that of the end portion of the inner race 3-1 on the inward side of the vehicle body.

As described above, the boot 17 is fastened to the protrusion 15-1 to form a restraining force between the extension portion 15 and the boot 17 in the axial direction.

Here, the axial direction means a direction of a rotation axis of the axle housing 7, and the radial direction means a radial direction based on the axial direction.

For reference, the axle housing 7 is fixed to the knuckle 5 in case of a front wheel, but may be fixed to a carrier in case of a rear wheel.

In addition, one side of the boot 17 is coupled to the extension portion 15 of the axle housing 7, as described above, and the other side of the boot 17 is coupled to the shaft 9 to allow refraction between the shaft 9 and the axle housing 7, while sealing and blocking such a refraction portion from the outside to function to inhibit or prevent penetration of foreign substances.

The boot 17 has a first contact portion 19 contacting the end portion of the extension portion 15 on the inward side of the vehicle body, a second contact portion 21 connected to the first contact portion 19 and contacting an outermost side of the protrusion 15-1, and a third contact portion 23 connected to the second contact portion 21 and contacting the protrusion 15-1 on an outward side of the vehicle body to form an inner groove 25 into which the protrusion 15-1 is inserted.

That is, by inserting the protrusion 15-1 of the extension portion 15 into the inner groove 25 formed by the first contact portion 19, the second contact portion 21 and the third contact portion 23 of the boot 17, the restraining force is formed between the boot 17 and the axle housing 7 in the axial direction.

Of course, a band 27 is coupled onto an outer side of the boot 17 described above. The band 27 is coupled to press the boot 17 from the outside toward the end portion of the inner race 3-1 on the inward side of the vehicle body and the protrusion 15-1, thereby keeping the boot 17 in a firmly coupled state.

The boot 17 has a band fastening groove 29 in the outer side thereof to fasten the band 27 thereto. When an axial-direction thickness of the extension portion 15 is denoted as t, and a distance from the end portion of the extension portion 15 on the inward side of the vehicle body to an end portion of the band fastening groove 29 on the inward side of the vehicle body is denoted as L, the end portion of the band fastening groove 29 on the inward side of the vehicle body is located within a range of 0 L/t 0.5.

That is, when the location of the end portion of the band fastening groove 29 on the inward side of the vehicle body is set as described above, an end portion of the band 27 on the inward side of the vehicle body is resultantly located to firmly surround the outer side of the extension portion 15 to press the extension portion 15, which is advantageous in seating the boot 17 and securing the sealability of the boot 17.

Meanwhile, when the outer diameter of the protrusion 15-1 is denoted as d, and the outer diameter of the end portion of the inner race 3-1 on the inward side of the vehicle body is denoted as D1, the outer diameter d of the protrusion 15-1 is within a range of $1.02 \leq d/D1 \leq 1.05$.

This substantially limits a height at which the protrusion 15-1 of the extension portion 15 protrudes such that the protruding height of the protrusion 15-1 is not too high, thereby securely assembling the boot 17, and the protruding height of the protrusion 15-1 is not too low, thereby effectively inhibiting or preventing the boot 17 from escaping.

Meanwhile, when an axial-direction width of the band 27 is denoted as B and an axial-direction thickness of the extension portion 15 is denoted as t, the width B of the band 27 is within a range of $0.3 \leq t/B \leq 1$.

This is to form the band 27 to have an axial-direction width greater than the axial-direction thickness of the extension portion 15, while the axial-direction width of the band 27 is not too great by about three times or more the axial-direction thickness of the extension portion 15, thereby not only securing the sufficient sealability of the boot 17 but also easily handling and assembling the band 27.

Of course, the band fastening groove 29 is formed to have a width to accommodate the band 27 and restrain both ends of the band 27 in the axial direction.

Meanwhile, the protrusion 15-1 has a first inclined portion 31 formed on the outward side of the vehicle body to have an outer diameter gradually decreasing toward the outward side of the vehicle body, and the third contact portion 23 of the boot 17 is formed in parallel with the first inclined portion 31.

The first inclined portion 31 allows the third contact portion 23 of the boot 17 to be seated thereon to not only easily assemble the boot 17 but also naturally induce a tightly coupled state between the boot 17 and the protrusion 15-1 by the pressing force of the band 27, thereby securing higher sealing performance.

The common configuration in all forms of the present disclosure has been described above. Hereinafter, the remaining forms of the present disclosure will be described.

Figure 3:
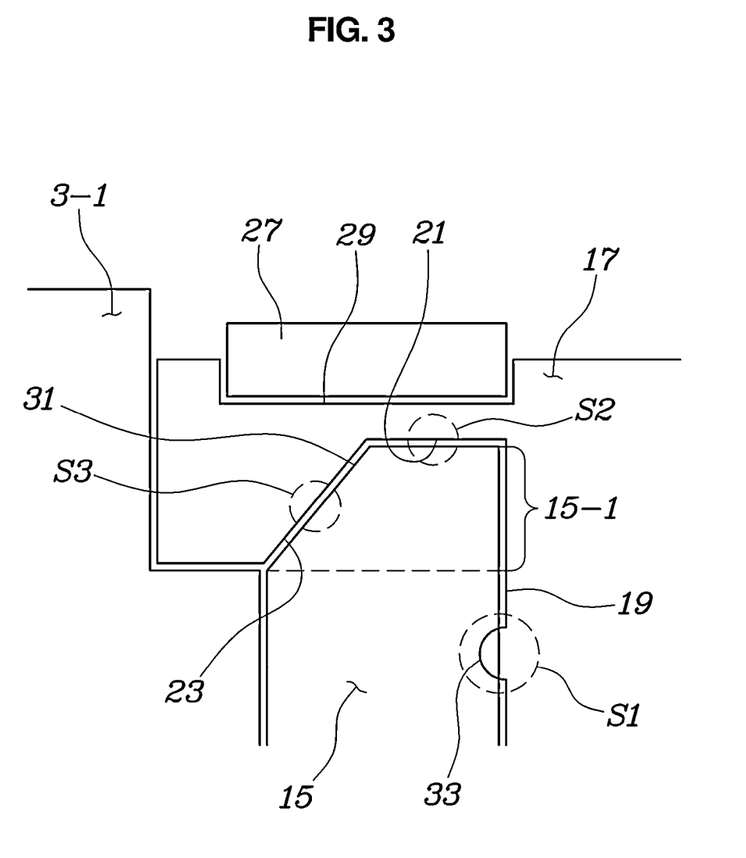
FIG. 3 is a view illustrating a constant velocity joint for a vehicle according to a second form of the present disclosure.

Referring to FIG. 3, a second form of the present disclosure is almost the same as the first form as illustrated in FIG. 1, while being different in that the boot 17 has a first protruding end 33 integrally formed to protrude locally from the first contact portion 19 toward the end portion of the extension portion 15 on the inward side of the vehicle body.

The first protruding end 33 is deformed to a compressed state between the boot 17 and the end portion of the extension portion 15, thereby serving to form a more reliable sealing state.

Figure 4:
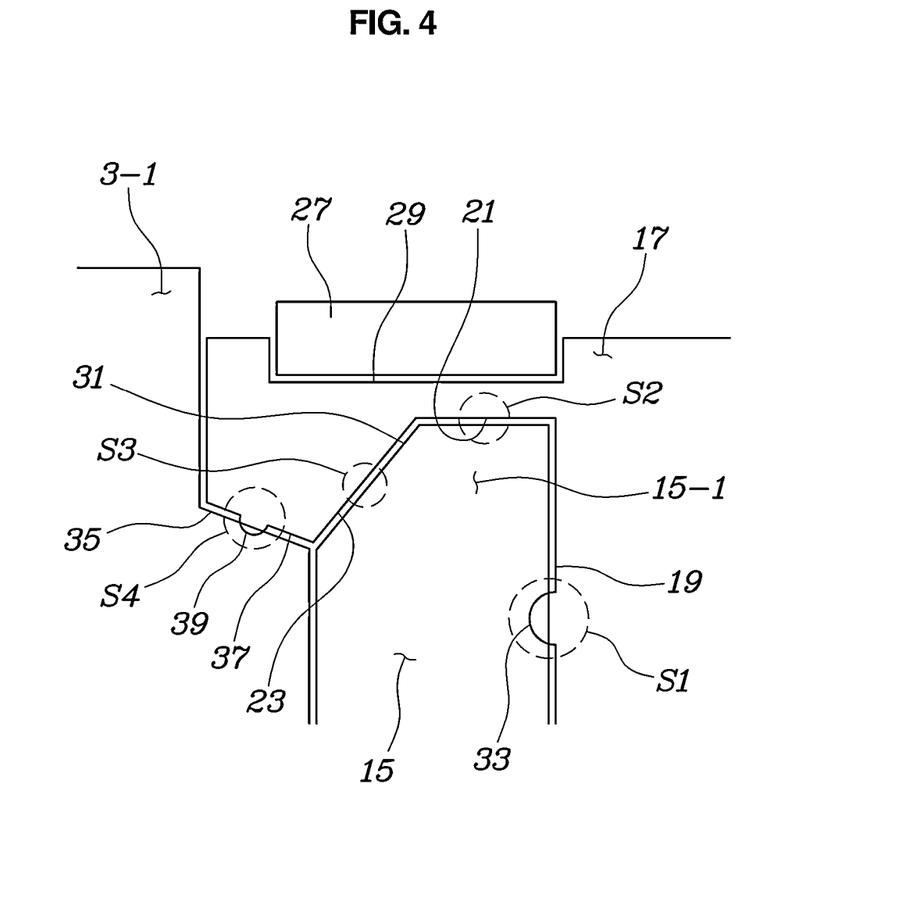
FIG. 4 is a view illustrating a constant velocity joint for a vehicle according to a third form of the present disclosure.

A third form of the present disclosure, as illustrated in FIG. 4, is almost the same as the second form as illustrated in FIG. 3, while being different in that: the inner race 3-1 has a second inclined portion 35 formed to have an outer diameter gradually increasing from an end portion thereof meeting the extension portion 15 toward the outward side of the vehicle body; and the boot 17 has a fourth contact portion 37 connected to the third contact portion 23 and formed in parallel with the second inclined portion 35 to contact the second inclined portion 35.

In addition, the boot 17 has a second protruding end 39 integrally formed to protrude locally from the fourth contact portion 37 toward the second inclined portion 35 of the inner race 3-1.

Accordingly, the boot 17 pressed by the band 27 toward the extension portion 15 of the axle housing 7 is capable of securely sealing the refraction portion between the axle housing 7 and the shaft 9 in a more faithful manner, based on a first sealing portion S1 formed by the first contact portion 19 and the end portion of the extension portion 15 on the inward side of the vehicle body, a second sealing portion S2 formed by the second contact portion 21 and the outermost side of the protrusion 15-1, a third sealing portion S3 formed by the third contact portion 23 and the first inclined portion 31, and a fourth sealing portion S4 formed by the fourth contact portion 37 and the second inclined portion 35.

Figure 5:
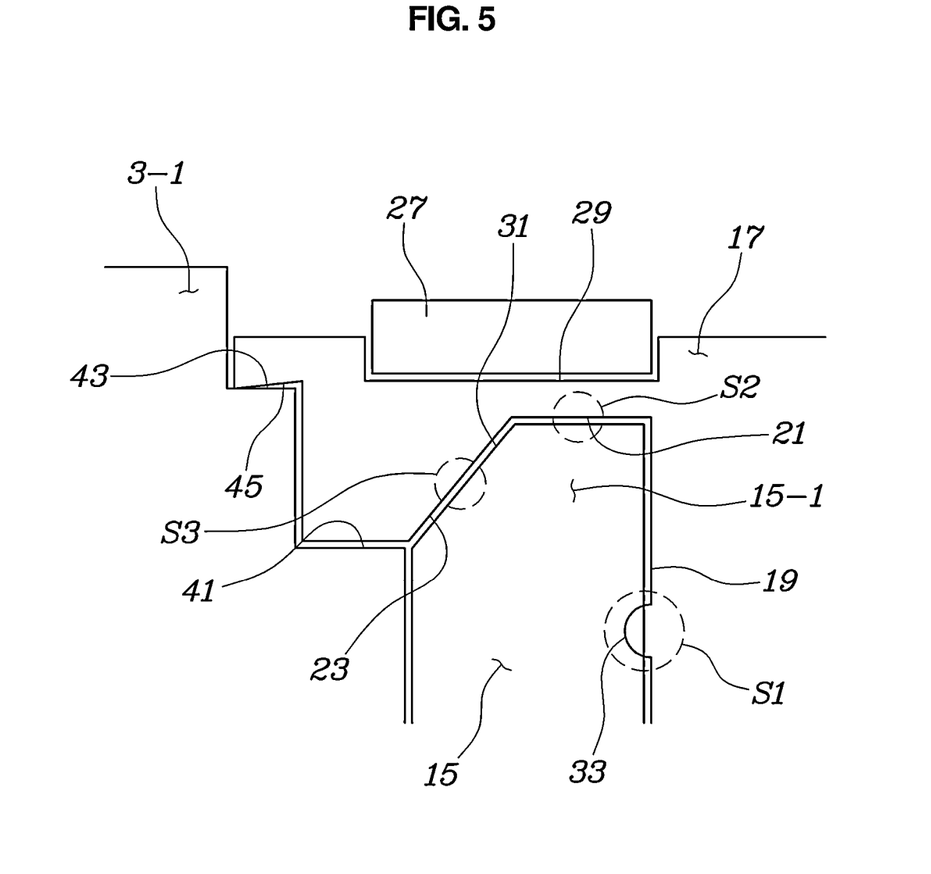
FIG. 5 is a view illustrating a constant velocity joint for a vehicle according to a fourth form of the present disclosure.

A fourth form of the present disclosure, as illustrated in FIG. 5, is almost the same as the second form as shown in FIG. 3, while being different in that: the inner race 3-1 has a first circumferential portion 41 formed to have a constant outer diameter from an end portion thereof meeting the extension portion 15 toward the outward side of the vehicle body, and a second circumferential portion 43 connected to the first circumferential portion 41 and formed to have a constant outer diameter greater than that of the first circumferential portion 41; and the boot 17 extends from the third contact portion 23 to surround both the first circumferential portion 41 and the second circumferential portion 43.

In addition, the boot 17 has a structure in which an inner side surface thereof surrounding the second circumferential portion 43 forms a third inclined portion 45 having an inner diameter gradually decreasing toward the outward side of the vehicle body.

In this case, the boot 17 is seated on the first circumferential part 41 and the second circumferential part 43 on a side thereof facing the inner race 3-1 to implement a function of preventing penetration of foreign substances. In particular, the third inclined portion 45 of the boot 17 contacting the second circumferential portion 43 is structurally capable of coupling an end portion of the boot 17 on the outward side of the vehicle body to the second circumferential portion 43 with a strong tightening force, thereby further reliably implementing the function of preventing penetration of foreign substances.

According to the present disclosure, in the constant velocity joint having a wheel hub that is integrally formed therewith, the firmly coupled state of the boot can be easily secured and the sealing function of the coupled boot can be excellently secured, thereby ultimately securing sufficient durability in the refraction portion of the constant velocity joint and moreover securely assembling and maintaining the constant velocity joint in an excellent manner.

Although the present disclosure has been shown and described with respect to specific forms, it will be apparent to those having ordinary skill in the art that the present disclosure may be variously modified and altered without departing from the spirit and scope of the present disclosure.

What is claimed is:

1. A constant velocity joint for a vehicle, the constant velocity joint comprising:
    an axle housing fixed to a knuckle by a hub bearing;
    a joint assembly inserted into an inner diameter portion of the axle housing and configured to transmit power from a shaft to the axle housing through a plurality of joint balls;
    an extension portion extended from an end portion of the axle housing in a radial direction of the axle housing, wherein the extension portion is disposed on an inward side of a vehicle body of the vehicle and configured to provide a pressing force to an inner race of the hub bearing in an axial direction of the axle housing; and
    a boot having one side configured to:
        surround an outer side of the extension portion,
        coupled to the extension portion, and
        form a restraining force between the extension portion and the boot in the axial direction,
    wherein the extension portion has a protrusion having an outer diameter greater than a diameter of an end portion of the inner race on the inward side of the vehicle body,
    wherein the boot includes:
        a first contact portion configured to contact an end portion of the extension portion on the inward side of the vehicle body,
        a second contact portion connected to the first contact portion and configured to contact an outermost side of the protrusion, and
        a third contact portion connected to the second contact portion and configured to contact the protrusion on an outward side of the vehicle body to form an inner groove into which the protrusion is inserted, and
    wherein:
        the protrusion has a first inclined portion formed on the outward side of the vehicle body,
        an outer diameter of the first inclined portion gradually decreases toward the outward side of the vehicle body, and
        the third contact portion of the boot is formed in parallel with the first inclined portion.

2. The constant velocity joint of claim 1, wherein the boot has a first protruding end protruding locally from the first contact portion toward the end portion of the extension portion on the inward side of the vehicle body.

3. The constant velocity joint of claim 1, wherein the inner race has a second inclined portion having an outer diameter gradually increasing from an end portion thereof and configured to meet the extension portion toward the outward side of the vehicle body; and
    the boot has a fourth contact portion connected to the third contact portion and formed in parallel with the second inclined portion to contact the second inclined portion.

4. The constant velocity joint of claim 3, wherein the boot has a second protruding end protruding locally from the fourth contact portion toward the second inclined portion of the inner race.

5. The constant velocity joint of claim 1, wherein the inner race includes:
    a first circumferential portion having a constant outer diameter from an end portion thereof and configured to meet the extension portion toward the outward side of the vehicle body; and
    a second circumferential portion connected to the first circumferential portion and configured to have a constant outer diameter greater than the outer diameter of the first circumferential portion, and
    wherein the boot is configured to extend from the third contact portion and surround both the first circumferential portion and the second circumferential portion.

6. The constant velocity joint of claim 5, wherein an inner side surface of the boot surrounding the second circumferential portion forms a third inclined portion having an inner diameter gradually decreasing toward the outward side of the vehicle body.

7. A boot for a constant velocity joint of a vehicle,
the boot configured to allow an extension portion of an axle housing to be inserted thereto so as to form a restraining force between the extension portion and the boot in an axial direction of the axle housing,
wherein:
the axle housing is configured to receive power from a shaft through a plurality of joint balls and is fixed to a knuckle by a hub bearing,
the extension portion is formed by deforming a part of the axle housing, and
the extension portion extends in a radial direction of the axle housing and configured to press an inner race of the hub bearing in the axial direction to fix the inner race,
wherein the boot further includes:
a first contact portion configured to contact an end portion of the extension portion on an inward side of a vehicle body,
a second contact portion connected to the first contact portion and configured to contact an outermost side of a protrusion of the extension portion having an outer diameter greater than an outer diameter of an end portion of the inner race on the inward side of the vehicle body, and
a third contact portion connected to the second contact portion and configured to contact the protrusion on an outward side of the vehicle body, and
wherein:
the protrusion has a first inclined portion formed on the outward side of the vehicle body,
the first inclined portion is configured to have an outer diameter gradually decreasing toward the outward side of the vehicle body, and
the third contact portion of the boot is formed in parallel with the first inclined portion, and
wherein the boot has a first protruding end protruding locally from the first contact portion toward the end portion of the extension portion on the inward side of the vehicle body.

8. The boot of claim 7, wherein:
the inner race has a second inclined portion having an outer diameter gradually increasing from an end portion thereof and configured to meet the extension portion toward the outward side of the vehicle body, and
the boot has a fourth contact portion connected to the third contact portion and formed in parallel with the second inclined portion to contact the second inclined portion.

9. The boot of claim 8, wherein the boot has a second protruding end protruding locally from the fourth contact portion toward the second inclined portion of the inner race.

10. The boot of claim 7, wherein the inner race includes:
a first circumferential portion having a constant outer diameter and configured to meet the extension portion toward the outward side of the vehicle body, and
a second circumferential portion connected to the first circumferential portion and configured to have a constant outer diameter greater than the constant outer diameter of the first circumferential portion,
wherein the boot is configured to extend from the third contact portion to surround both the first circumferential portion and the second circumferential portion.

11. The boot of claim 10, wherein an inner side surface of the boot surrounding the second circumferential portion forms a third inclined portion having an inner diameter gradually decreasing toward the outward side of the vehicle body.

* * * * *